United States Patent
Thakkar et al.

(10) Patent No.: US 9,934,060 B2
(45) Date of Patent: Apr. 3, 2018

(54) HYBRID SERVICE FLEET MANAGEMENT FOR CLOUD PROVIDERS

(71) Applicant: VMWARE, INC., Palo Alto, CA (US)

(72) Inventors: Sachin Thakkar, Palo Alto, CA (US); Debashis Basak, Palo Alto, CA (US); Serge Maskalik, Palo Alto, CA (US); Aravind Srinivasan, Palo Alto, CA (US); Narendra Kumar Basur Shankarappa, Palo Alto, CA (US); Abhinav Vijay Bhagwat, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 346 days.

(21) Appl. No.: 14/881,207

(22) Filed: Oct. 13, 2015

(65) Prior Publication Data

US 2016/0105311 A1    Apr. 14, 2016

Related U.S. Application Data

(60) Provisional application No. 62/063,395, filed on Oct. 13, 2014.

(30) Foreign Application Priority Data

Oct. 13, 2015 (IN) ........................... 5475/CHE/2015

(51) Int. Cl.
*H04L 12/24* (2006.01)
*G06F 9/455* (2018.01)

(52) U.S. Cl.
CPC ...... *G06F 9/45558* (2013.01); *H04L 41/0813* (2013.01); *H04L 41/5051* (2013.01); *G06F 2009/4557* (2013.01); *G06F 2009/45595* (2013.01); *H04L 41/5096* (2013.01)

(58) Field of Classification Search
None
See application file for complete search history.

(56) References Cited

U.S. PATENT DOCUMENTS

| | | | |
|---|---|---|---|
| 9,148,414 B1* | 9/2015 | Roth | H04L 63/08 |
| 9,201,704 B2* | 12/2015 | Chang | G06F 9/45558 |
| 9,294,282 B1* | 3/2016 | Potlapally | H04L 9/3236 |
| 9,485,234 B1* | 11/2016 | Roth | H04L 63/20 |
| 2009/0049453 A1* | 2/2009 | Baran | G06F 9/544 |
| | | | 719/313 |
| 2014/0109174 A1* | 4/2014 | Barton | H04W 12/08 |
| | | | 726/1 |

(Continued)

FOREIGN PATENT DOCUMENTS

| | | | |
|---|---|---|---|
| JP | 2014230217 A | * | 12/2014 |
| KR | 20170058201 A | * | 5/2017 |

*Primary Examiner* — Natisha D Cox

(57) ABSTRACT

A fleet manager within a cloud computing system utilizes a registration framework with one or more cloud infrastructure managers having corresponding infrastructure data plane nodes, which may be in use by different tenants. Instead of having the infrastructure managers communicate directly with its corresponding infrastructure data plane nodes via a management network or domain, the fleet manager communicates with infrastructure managers and relay commands, instructions, and other payloads to the infrastructure data plane nodes using a virtual machine (VM) communication backchannel.

20 Claims, 3 Drawing Sheets

(56) References Cited

U.S. PATENT DOCUMENTS

| | | | | |
|---|---|---|---|---|
| 2015/0227381 A1* | 8/2015 | Botzer | ................ | H04L 41/0213 |
| | | | | 718/1 |
| 2015/0378760 A1* | 12/2015 | Su | ....................... | G06F 9/45558 |
| | | | | 718/1 |
| 2016/0292053 A1* | 10/2016 | Antony | ................. | G06F 11/203 |
| 2017/0163528 A1* | 6/2017 | Cohn | .................... | H04L 45/586 |
| 2017/0171157 A1* | 6/2017 | Hristov | .............. | H04L 63/0272 |

* cited by examiner

HYBRID SERVICE FLEET MANAGEMENT FOR CLOUD PROVIDERS

CROSS-REFERENCE TO RELATED APPLICATION(S)

This application claims the benefit of U.S. Provisional Patent Application No. 62/063,395, filed Oct. 13, 2014, and India Application No. 5475/CHE/2015, filed Oct. 13, 2015, the entire contents of which are incorporated by reference herein.

BACKGROUND

Cloud architectures are used in cloud computing and cloud storage systems for offering infrastructure-s-a-service (IaaS) cloud services. Examples of cloud architectures include the VMware vCloud™ Director cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

SUMMARY

Embodiments of the present disclosure provide a method, a system, and a computer readable storage medium configured for managing a cloud computing system. In one embodiment, the method includes receiving a request from an infrastructure management node to modify an infrastructure node in a cloud computing system. The infrastructure node is associated with a first tenant of the cloud computing system. The method further includes generating a fleet request for the infrastructure node executing as a first virtual machine (VM) based on the request to modify the infrastructure node. The first VM and a hypervisor managing the first VM are executing on a host in the cloud computing system. The method further includes injecting the fleet request into the first VM using a VM backchannel through the hypervisor.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
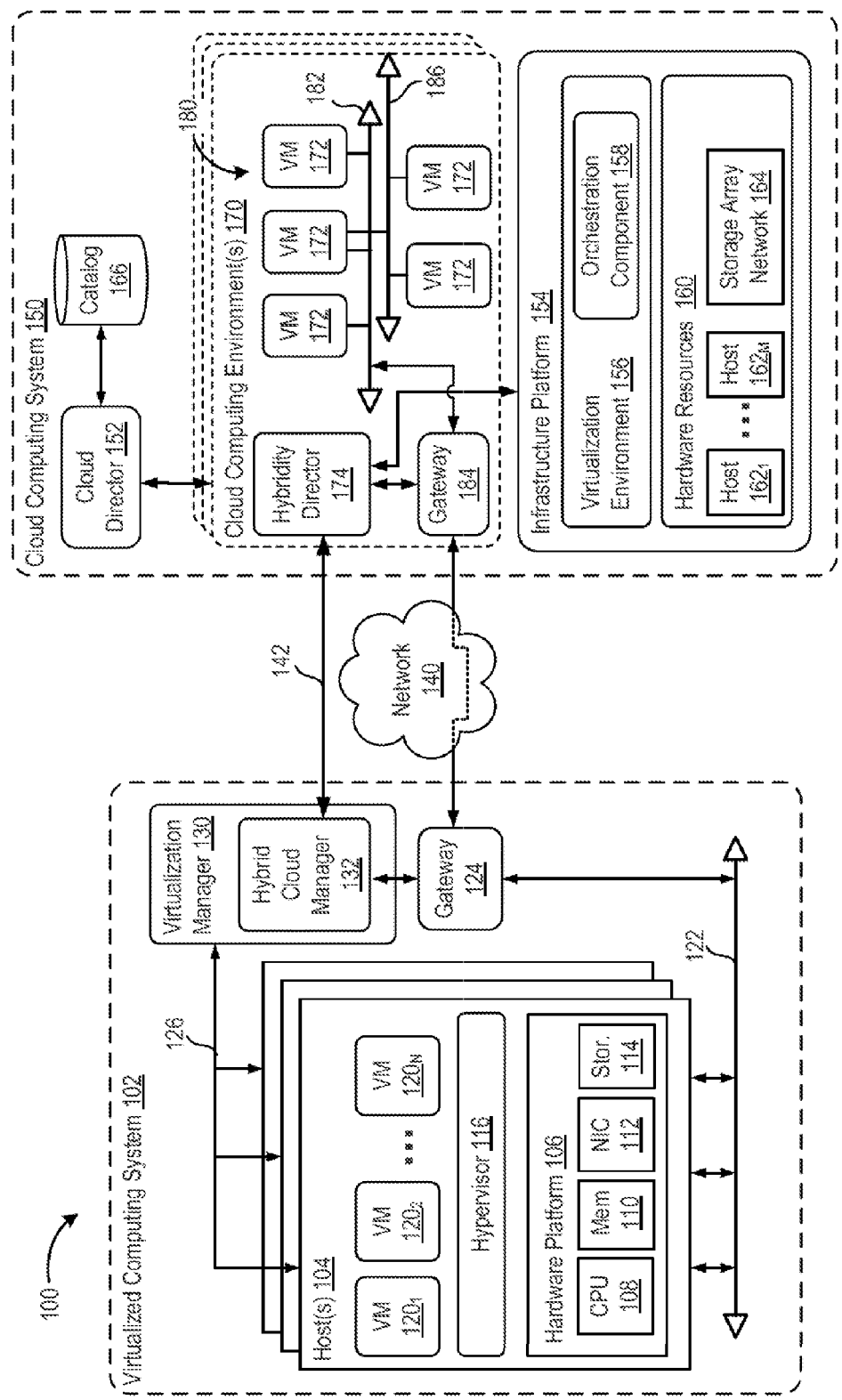
FIG. 1 is a block diagram that illustrates a computer system in which one or more embodiments may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Figure 2:
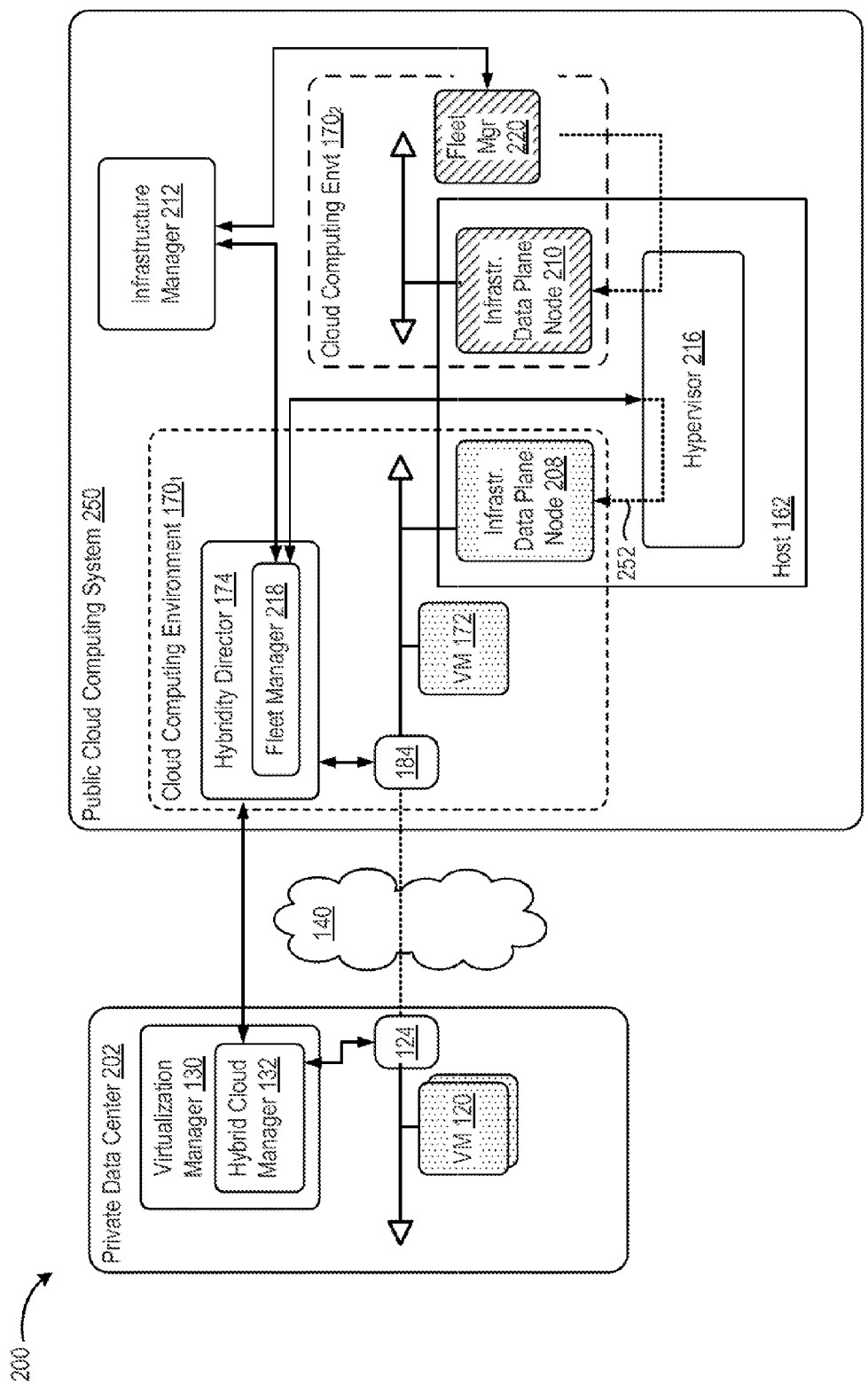
FIG. 2 is a block diagram depicting operations for managing infrastructure nodes of a hybrid cloud computing system, according to one embodiment of the present disclosure.

FIG. 2 is a block diagram depicting operations for managing infrastructure nodes of a hybrid cloud computing system 200, according to one embodiment of the present disclosure. Hybrid cloud computing system 200 is configured to provide a common platform for executing virtual workloads seamlessly between a private data center 202, which may configured similar to virtualized computing system 102, and a public cloud computing system 250, which may be configured similar to cloud computing system 150 in FIG. 1. Private data center 202 may be managed by an enterprise (first organization), and the enterprise may be a tenant in public cloud computing system 250, which is managed by a cloud provider (second organization). For example, a first cloud computing environment 170$_1$ within public cloud computing system 250 may be made available to the enterprise as one tenant, while other cloud computing environments (e.g., 170$_2$) having other VMs (e.g., 224) associated other tenants may be allocated in public cloud computing system 250.

In some cases, one or more of the VMs deployed within cloud computing environment 170 may be an infrastructure data plane node 208 configured to provide infrastructure services, IT management services, and other infrastructure-related functions within the tenant's virtual data center. Infrastructure data plane nodes 208 may be virtual appliances executing as a VM, such as an IT management network appliance that provides DHCP, DNS, and IP address management, or a firewall node. Typically, multiple infrastructure data plane nodes (in a private data center) are typically centrally managed by an infrastructure manager 212 (interchangeably referred to herein as an infrastructure management node). In the case of a firewall infrastructure, multiple firewall data plane nodes would be responsible for filtering packets according to rules which have been pushed down to the nodes by a central firewall infrastructure manager.

However, there are challenges in managing the life cycle of infrastructure data plane nodes in a multi-tenant environment such as cloud computing system 250. For example, it may be infeasible to instantiate a separate instance of an infrastructure manager 212 for every single tenant that has an infrastructure data plane node, such as node 208 for a first tenant (of cloud computing environment 170$_1$) and a node 210 depicted in FIG. 2 as a different tenant (of cloud computing environment 170$_2$). On the other hand, having a shared instance of an infrastructure manager 212 would typically require all the infrastructure data plane nodes to be on a common management network or a common management domain as the shared instance of the infrastructure manager. However, this would violate principles of tenant isolation and security.

Accordingly, embodiments of the present disclosure provide an in-line fleet management for cloud providers.

Hybridity director 174 includes a fleet manager 218 configured to manage the lifecycle of infrastructure data plane nodes requested by a particular tenant. In some embodiments, each tenant of cloud computing system 250 has its own instance of a fleet manager, e.g., the tenant of cloud computing environment 170₁ has a fleet manager 218, while a different tenant (of cloud computing environment 170₂) has a different fleet manager instance 220. In alternative embodiments, fleet manager 218 may be a centralized instance within cloud computing system 250.

For sake of explanation, embodiments are described from the perspective of fleet manager 218, however it should be recognized that other fleet managers instances (e.g., fleet manager 220) may perform similar operations and functions. It is further understood that infrastructure management node 212 can similarly manage infrastructure data plane nodes 210 associated with a different tenant with the respective fleet manager instance 220 executing within cloud computing environment 170₂.

In one or more embodiments, fleet manager 218 is configured to utilize a registration framework with each infrastructure manager 212. Fleet manager 218 may instantiate one or more infrastructure data plane nodes 208 in response to a tenant's request, and register those instantiated nodes with the respective infrastructure manager 212. Fleet manager 218 is configured to communicate with infrastructure managers 212 and relay commands, instructions, and other payloads to infrastructure data plane nodes 208, 210 using a VM communication backchannel 252, such as a virtual machine communication interface (VMCI) technology made available by VMware, Inc. of Palo Alto, Inc, or virtual infrastructure exchange (VIX).

During operation, fleet manager 218 may, in response to a tenant request, deploy an infrastructure data plane node within a cloud computing environment associated with that tenant. Fleet manager 218 may register the deployment request with the respective infrastructure manager 212, and then instantiate a VM in a particular host that executes the infrastructure data plane node (e.g., executing as a virtual appliance). A handle or pointer to the host on which the infrastructure data plane node is deployed may be tracked.

Accordingly, embodiments of the present disclosure enable management of a particular infrastructure data plane node (VM) executing on a particular host 162 in a manner that does not require nodes of different tenants to share a common management domain or management network. In one embodiment, fleet manager 218 is configured to manage state for each tenant per device. For sake of illustration, FIG. 2 depicts a case where VMs of different tenants are co-mingled on a same host 162. It is understood that the described technique is also utilized in systems where VM of different tenants are executing on different hosts.

Figure 3:
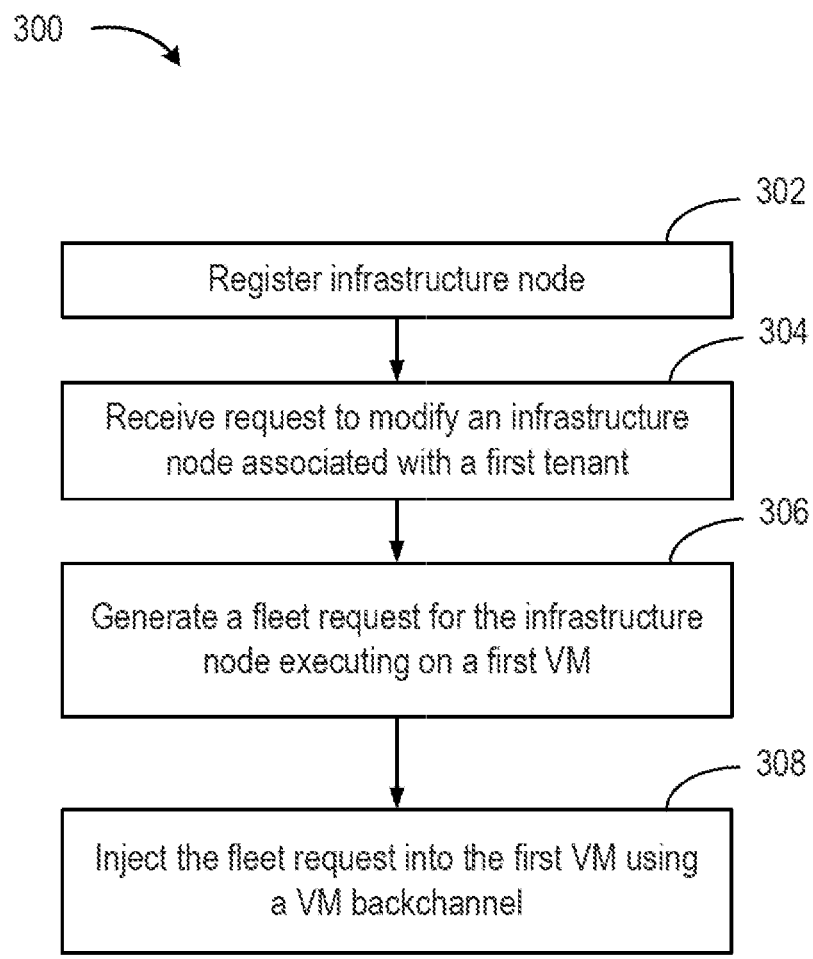
FIG. 3 is a block diagram depicting a method for managing a cloud computing system, according to one embodiment of the present disclosure.

FIG. 3 is a block diagram depicting a method 300 for managing a cloud computing system, according to one embodiment of the present disclosure. While method 300 is described in conjunction with the systems depicted in FIGS. 1-2, it should be understood that method 300 may be utilized by other systems.

Method 300 begins at step 302, in which an infrastructure management node 212 (e.g., executing as a VM) registers one or more infrastructure data plane nodes 208 associated with a tenant with a fleet manager 218. In some embodiments, infrastructure management node 212 may provide fleet manager 218 with a reference (e.g., a handle, pointer, or other identifier) indicating the existing virtual machine and/or host on which the nodes 208 are deployed. In other embodiments, infrastructure management node 212 can provide a packaged virtual machine (e.g., using an Open Virtualization Format, or "OVF") to fleet manager 218 that represents the VM footprint for a new node 208. Fleet manager 218 stores the registered information in one or more data structures that tracks which VMs are running as infrastructure data plane nodes 208 for which infrastructure management nodes 212 of the associated tenant.

In some embodiments, infrastructure node 208 is a virtual appliance running in the cloud computing system, and infrastructure management node 212 is configured to manage an application lifecycle of that virtual appliance. For example, the infrastructure node might be a firewall virtual appliance managed by a central firewall infrastructure manager. While method 300 is described from the perspective of a single infrastructure manager node 212, it is understood that cloud computing system 250 may include a variety of infrastructure management nodes, each of which are configured to manage their own respective infrastructure data plane nodes. For example, there might be storage appliance infrastructure management node having corresponding virtual storage appliances as infrastructure nodes.

At step 304, fleet manager 218 receives a request from infrastructure management node 212 to modify an infrastructure node 208 in cloud computing system 250. As described earlier, infrastructure node 208 is associated with a first tenant of the cloud computing system. In some embodiments, the request to modify an infrastructure node in the cloud computing system may be a request to update one or more configurations of the infrastructure node. For example, an infrastructure management node 212 that is a firewall management utility may send a request to fleet manager 218 to update firewall rules or other configurations of a particular firewall appliance (i.e., node 208).

In some embodiments, the request to modify an infrastructure node in the cloud computing system may be a request to instantiate a new infrastructure node. In such cases, fleet manager 218 retrieves the virtual machine package (e.g., OVF format) previously registered by infrastructure management node 212 (i.e., step 302), and instantiates a new node using the virtual machine package. In some embodiments, the request to modify an infrastructure node in the cloud computing system may be a request to shut down an existing infrastructure node.

At step 306, fleet manager 218 generates a fleet request for infrastructure node 208 executing as a first VM based on the request to modify the infrastructure node. As depicted in FIG. 2, infrastructure node 208 is executing as a VM that is managed by hypervisor 216 on a host 162 in the cloud computing system. In some embodiments, the fleet request for infrastructure node 208 includes a payload of information needed to modify the infrastructure node, as well as identifying information for targeting that particular infrastructure node 208.

At step 308, fleet manager 218 injects the fleet request into the first VM using a VM backchannel 252 through hypervisor 216. In some embodiments, fleet manager 218 injecting the fleet request into the first VM using the VM backchannel through the hypervisor by inserting the fleet request into a virtual network interface of the first VM, which is then processed as part of the guest network stack of the first VM. In another embodiment of VM communication backchannel 252, fleet manager 218 establishes a socket-like connection to infrastructure node 208 via a driver or other module installed in the guest operating system of the first VM. In one or more embodiments, the request to modify the infrastructure node is not transmitted directly to the infrastructure node through a management network of the cloud computing system. As such, infrastructure management node 212 does not need to have a direct IP access to its corresponding infrastructure nodes 208.

Method 300 can be extended to handle a return response or status result from an infrastructure data plane node 208 to its corresponding infrastructure management node 212. That is, fleet manager 218 may receive a response from node 208 via backchannel 252 as a result of modifications or updates performed on node 208. Fleet manager 218 processes the response and relays the response to the appropriate infrastructure management node 212 (e.g., via normal management network communications). In some embodiments, fleet manager 218 can include tenant-specific information along with the relayed response.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for managing a cloud computing system, the method comprising:
   receiving a request from an infrastructure management node to modify an infrastructure node in a cloud computing system, wherein the infrastructure node is associated with a first tenant of the cloud computing system;
   generating a fleet request for the infrastructure node executing as a first virtual machine (VM) based on the request to modify the infrastructure node, wherein the first VM and a hypervisor managing the first VM are executing on a host in the cloud computing system; and
   injecting the fleet request into the first VM using a VM backchannel through the hypervisor.

2. The method of claim 1, further comprising:
   registering, by operation of a fleet manager, the infrastructure node with a reference to the first VM.

3. The method of claim 1, wherein injecting the fleet request into the first VM using the VM backchannel through the hypervisor comprises inserting the fleet request into a virtual network interface of the first VM.

4. The method of claim 1, wherein the request to modify the infrastructure node in the cloud computing system comprises a request to instantiate a new infrastructure node.

5. The method of claim 1, wherein the request to modify the infrastructure node in the cloud computing system comprises a request to update one or more configurations of the infrastructure node.

6. The method of claim 1, wherein the infrastructure node comprises a virtual appliance running in the cloud computing system, and the infrastructure management node is configured to manage an application lifecycle of the virtual appliance.

7. The method of claim 1, wherein the request to modify the infrastructure node is not transmitted directly to the infrastructure node through a management network of the cloud computing system.

8. The method of claim 1, wherein the infrastructure node comprises a firewall virtual appliance managed by the infrastructure management node comprising a central firewall infrastructure manager.

9. A system, the system comprising:
a system memory comprised program code;
a processor configured to execute the program code and perform an operation for managing a cloud computing system comprising:
  receiving a request from an infrastructure management node to modify an infrastructure node in a cloud computing system, wherein the infrastructure node is associated with a first tenant of the cloud computing system;
  generating a fleet request for the infrastructure node executing as a first virtual machine (VM) based on the request to modify the infrastructure node, wherein the first VM and a hypervisor managing the first VM are executing on a host in the cloud computing system; and
  injecting the fleet request into the first VM using a VM backchannel through the hypervisor.

10. The system of claim 9, wherein the processor is configured to perform the operation further comprising:
  registering, by operation of a fleet manager, the infrastructure node with a reference to the first VM.

11. The system of claim 9, wherein injecting the fleet request into the first VM using the VM backchannel through the hypervisor comprises inserting the fleet request into a virtual network interface of the first VM.

12. The system of claim 9, wherein the request to modify the infrastructure node in the cloud computing system comprises a request to instantiate a new infrastructure node.

13. The system of claim 9, wherein the request to modify the infrastructure node in the cloud computing system comprises a request to update one or more configurations of the infrastructure node.

14. The system of claim 9, wherein the infrastructure node comprises a virtual appliance running in the cloud computing system, and the infrastructure management node is configured to manage an application lifecycle of the virtual appliance.

15. The system of claim 9, wherein the request to modify the infrastructure node is not transmitted directly to the infrastructure node through a management network of the cloud computing system.

16. The system of claim 9, wherein the infrastructure node comprises a firewall virtual appliance managed by the infrastructure management node comprising a central firewall infrastructure manager.

17. A non-transitory computer-readable storage medium comprising instructions that, when executed in a computing device, manage a cloud computing system, by performing the steps of:
  receiving a request from an infrastructure management node to modify an infrastructure node in a cloud computing system, wherein the infrastructure node is associated with a first tenant of the cloud computing system;
  generating a fleet request for the infrastructure node executing as a first virtual machine (VM) based on the request to modify the infrastructure node, wherein the first VM and a hypervisor managing the first VM are executing on a host in the cloud computing system; and
  injecting the fleet request into the first VM using a VM backchannel through the hypervisor.

18. The non-transitory computer-readable storage medium of claim 17, wherein the instructions further perform the steps of:
  registering, by operation of a fleet manager, the infrastructure node with a reference to the first VM; and
  inserting the fleet request into a virtual network interface of the first VM.

19. The non-transitory computer-readable storage medium of claim 17, wherein the request to modify the infrastructure node in the cloud computing system comprises at least one of (1) a request to instantiate a new infrastructure node; and (2) a request to update one or more configurations of the infrastructure node.

20. The non-transitory computer-readable storage medium of claim 17, wherein the infrastructure node comprises a virtual appliance running in the cloud computing system, and the infrastructure management node is configured to manage an application lifecycle of the virtual appliance.

* * * * *